UNITED STATES PATENT OFFICE.

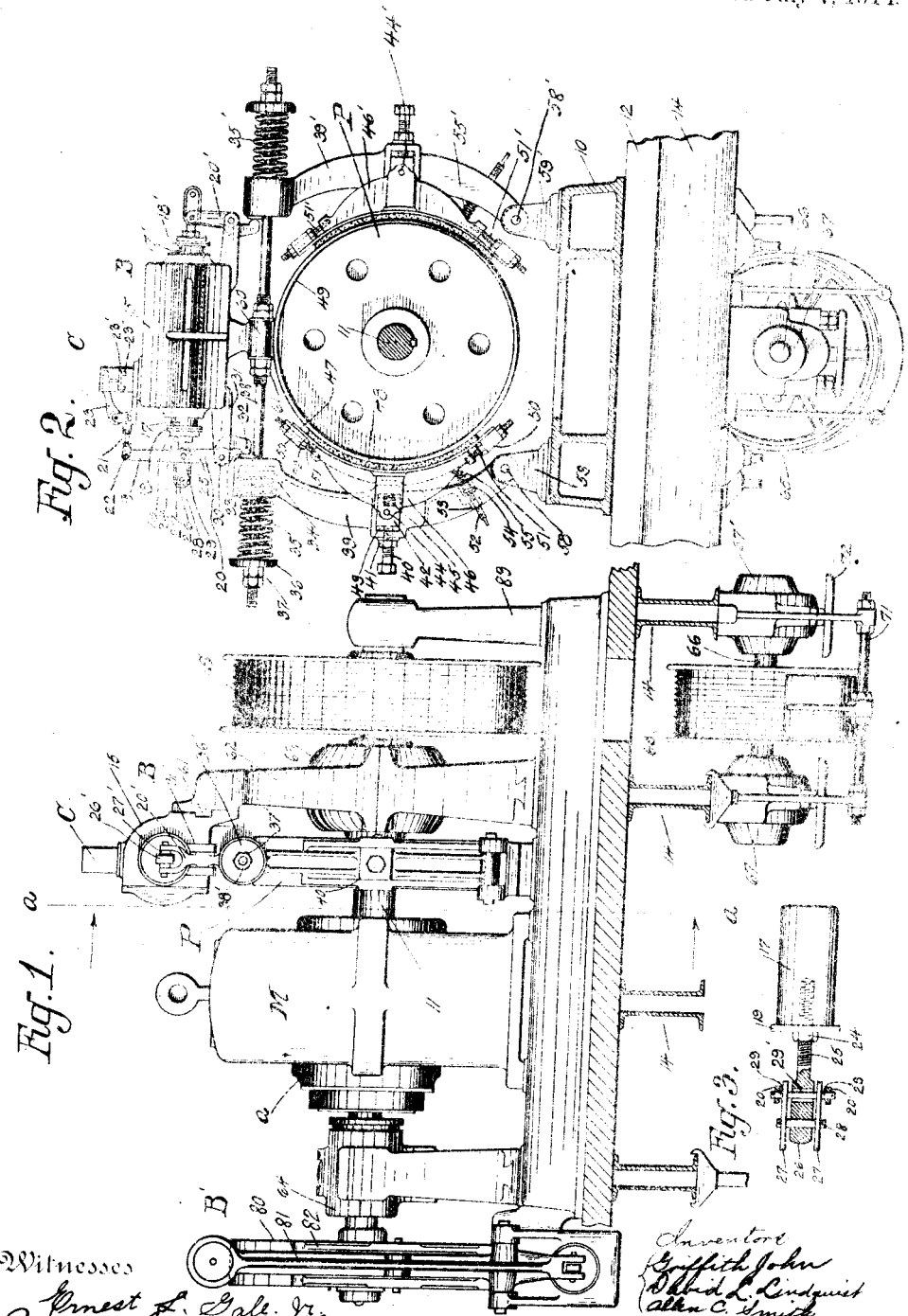

DAVID L. LINDQUIST, OF YONKERS, ALLEN C. SMITH, OF NEW YORK, AND GRIFFITH JOHN, OF YONKERS, NEW YORK, ASSIGNORS TO OTIS ELEVATOR COMPANY, OF JERSEY CITY, NEW JERSEY, A CORPORATION OF NEW JERSEY.

BRAKE APPARATUS FOR TRACTION-ELEVATORS.

1,102,523. Specification of Letters Patent. Patented July 7, 1914.

Application filed October 24, 1908. Serial No. 459,346.

*To all whom it may concern:*

Be it known that we, DAVID L. LINDQUIST, a subject of the King of Sweden, ALLEN C. SMITH, a citizen of the United States, and GRIFFITH JOHN, a subject of the King of England, residing at Yonkers, New York, New York city, New York, and Yonkers, New York, respectively, have invented a new and useful Improvement in Brake Apparatus for Traction-Elevators, of which the following is a specification.

Our invention relates to improvements in elevator brakes, which are adapted to have a general application, but some features of which are especially designed for use in connection with traction or direct drive elevators and other hoisting apparatus.

One object of our invention is the provision of means for the separate and independent adjustment of parts.

A further object is to facilitate the removal and replacing of worn out or broken parts without disturbing the remainder of the brake apparatus.

Other objects of the invention will appear hereinafter, the novel combinations of elements being set forth in the appended claim.

In the accompanying drawings, Figure 1 illustrates in side elevation an electric motor with the application of our invention thereto; Fig. 2 is a sectional view of Fig. 1 taken on the line *a—a* looking in the direction of the arrows; and Fig. 3 is a detail of connections between the brake lever and the releasing magnet.

Referring to the drawings, M designates an electric motor, the armature *a* and shaft 11 of which are adapted to rotate in bearings 64 and 63.

S is a grooved cable sheave mounted upon the armature shaft 11 and coöperates with a similar grooved cable sheave 65 which is mounted on a shaft 66 and adapted to rotate in bearings 67, 67' which may be suspended from the floor 12 by channel beams 14, 14, or located in any other desirable position.

B designates the brake apparatus which is preferably located as near the motor M as possible.

P designates the brake pulley which is mounted upon the motor shaft 11 and keyed or otherwise secured thereto. The brake apparatus B comprises two brake levers 39 and 39' pivoted to brackets 59, 59', respectively, which are secured to the bed 10 by bolts or otherwise. As shown, the brake apparatus is symmetrically constructed. A description of the left-hand portion will apply also to the right-hand portion so far as the levers, shoes and connections are concerned. The brake lever 39 is provided at its upper end with a recess portion 34 in which lies a compression spring 35. The other end of this spring bears against a collar 36 which is adjustably mounted upon a threaded rod 38 and secured in proper position by means of the nuts 37. The rod 38 is screwed into a stationary bracket 60 and locked in position by the nuts 61. If desired, a single rod extending through the bracket 60 may be used in place of a rod 38 on each side.

46 designates a brake shoe which is pivoted at 44 to a sliding block 42 which is contained in and adapted to slide in a recess or slot 43 provided in the brake lever 39. A compression spring 45 bears against the bottom of the recess 43 and the sliding block 42 thereby holding the latter against an adjusting set screw 40 which is locked in position by the nut 41. A set screw 52 and lock nut 53 are provided toward the lower end of the brake lever 39, and are adapted to regulate the tension of a spring 55 which lies in a recess 54 in the brake lever and bears against the lower portion of the brake shoe 46.

47 designates a brake band, the inner face of which is preferably lined with leather or other suitable material securely fastened thereto. The ends of the brake band 47 are adjustably secured to the brake shoe. The securing means therefor in this instance comprises a bracket 50 at each end of the brake band which brackets are rigid with the brake band, and through each of which passes a threaded screw 51. One end of each screw 51 is screwed into the brake shoe 46, while locking nuts 72 are provided on the screws 51 at the faces of the brackets 50 adjacent to the brake shoe.

The brake levers 39, 39' and their connected parts are preferably operated by an electromagnet, although manual or other well-known means may be used advantageously if so desired. The electromagnet herein shown comprises a magnet frame 15 in which is located a magnetizing coil or solenoid which operates when energized to effect the release of the brake, thereby allowing the brake pulley P to turn freely.

17, 17′ designate magnet cores which are similar in every respect and are arranged to move freely in the central hole through the magnet frame and inclosed solenoid. Each core 17, 17′ is formed with a head 19 of larger diameter than the core body adjacent which are resilient washers 18 of leather or other suitable material. A stem 25 is screwed into each core at one end and locked in place by means of a locking nut 24. The outer end 26 of the stem 25 is enlarged and flattened, and a hole is drilled therein to receive a pin 28, (Fig. 3). Located on opposite sides of the flattened portion 26 are links 27, pivoted by means of the pin 28 extending through the links and the part 26. A bolt 29 extending through an enlarged opening 29′ in the stem 25 pivotally connects the inner ends of the links 27 with a forked lever arm 20 which latter is pivoted at 30 to a stationary bracket 31 which may be a separate piece bolted to the magnet frame 15 or integral therewith. The lower end of the forked lever 20 is curved so as to reduce to a minimum the sliding movement between itself and the brake lever 39. This curved portion forms a toe 32 which is adapted to engage a raised portion 33 on the brake lever. By having the point of contact of the parts 32 and 33 substantially in a line with the pivots 30 and 58 the relative movement or sliding at the contact surfaces and consequently the friction and wear are reduced to a minimum. Preferably, both the toe 32 and raised portion 33 are hardened steel so that they may better withstand wear. The forked lever 20 on the left-hand side of the magnet frame 15 is extended upwardly at 9 and is connected by a pin 2 to an adjustable connector 21 which is connected to a switch arm 23. The switch arm 23 which extends into a casing C mounted on top of the magnet frame, carries an electric conducting plate or bar 23′ adapted to bridge the stationary contacts 23″ in the circuit of the brake magnet coil. While the brakes are applied this switch is closed, permitting a heavy current to be sent through the brake magnet coil whenever it is desired to release the brakes, but as the magnet cores are drawn in to release the brakes, the switch is opened to introduce into the magnet circuit a resistance connected between the contacts 23″, and thereby reduce the current in the magnet circuit. As this method of automatically controlling the current strength in the magnet coil is well understood by those skilled in the art, further description and illustration is deemed unnecessary.

The standard 62 which supports the motor shaft bearing 63 extends upwardly, thereby forming a suitable support for the magnet frame 15 and its connected parts. By constructing a tongue and groove or similar joint 61 between the support 62 and magnet frame 15, the latter can never get out of horizontal alinement, which is a desirable feature.

The principle of operation of the brake apparatus herein illustrated and described is similar to other brake apparatus used for a like purpose, i. e., the brake is normally applied by spring pressure and is released by electric power or other means when so desired. The link connection between the magnet cores 17, 17′, and the forked levers 20, 20′, respectively, allows a straight line movement of the magnet cores, consequently they may be machined to a closer fit in the magnet frame 15 than is the usual practice, thereby greatly increasing the efficiency of the releasing magnet. The resilient washers 18, 18′, not only limit their respective magnet cores in their inward movement, but act as buffers so that noise is reduced. The tension of the brake-applying spring 35 may be readily adjusted and locked in final position by means of the nuts 37. In this manner any desired pressure may be transmitted through the brake lever 39 and connected brake shoe 46 and band 47 with corresponding braking effect upon the pulley P. This adjustment is independent of the spring 35′ and its adjusting means.

As hereinbefore explained, the sliding block 42 to which is pivotally connected the brake shoe 46 is held firmly against the adjusting bolt 40 by means of the compression spring 45. In this way all lost motion between the brake lever and brake shoe is taken up and the latter moves simultaneously with the brake lever when the brake is applied. When the brake is released, however, the brake lever may move first, and motion may then be transmitted from the same through the spring 45 to the brake shoe.

That part of any brake apparatus which is subjected to the greatest amount of wear is invariably the brake band or other part which is in direct frictional contact with the periphery of the brake pulley. In the brake apparatus herein illustrated and described, the linings 48 of the brake bands are the only parts of the apparatus which engage the brake pulley directly, and it is these linings which receive substantially all of the wear when in service. Since the brake bands and their linings are preferably riveted together at numerous places, it will be desirable to renew both linings and bands. Ample provision is made for readily doing this, all that is necessary being to unloosen the screw bolts 51, 51′ and remove the worn out bands and replace them with others, the entire operation requiring but a short time.

The brake bands may be adjusted by means of either or both of the screw bolts 51 or 51'.

Since the brake levers 39 and 39' are independent of each other and are applied by separate springs, it is readily seen that should either spring become damaged or broken the brake apparatus is still operative, although its effectiveness would be somewhat impaired. The adjusting bolt 40 varies the position of the brake shoe with respect to the brake lever, and it should be particularly noted that by reason of the bolt 40 and the parts adjustable thereby, the brake shoes may be adjusted at frequent intervals to take up the wear on the brake leather 48 until the latter is worn very thin. Any variation in the position of the magnet cores due to such adjustment may be readily compensated for by the adjusting means 24.

It is readily seen that a brake apparatus constructed in the manner herein set forth permits of separate and independent adjustments of its various parts, and also provides means for readily removing and replacing worn out or broken parts without interfering in any way with the adjustments of other parts of the apparatus. Furthermore, the life of the brake leather is very much prolonged.

In addition to the brake mechanism above described, we sometimes employ auxiliary brake mechanism B' where the motor is used for lifting heavy loads or for other work where a powerful brake may be desired. An example of such use is found in elevator systems where the motor may be required to lift an occasional heavy load, such as a safe, when both brakes may be employed. The brake mechanism B' comprises a brake pulley 80 secured to the motor shaft either outside the bearing 64, as shown, or between said bearing and the motor. The brake levers 81 carry brake shoes adapted to be applied to the pulley 80. Springs may be employed to apply the brake shoes and an electromagnet to release them, as shown in the brake mechanism B, or any other suitable construction may be employed.

The end of the motor shaft on which the sheave S is mounted is preferably extended beyond the sheave and journaled in a standard 83. This reduces the strain on the motor shaft and results in a much more even distribution of the load on the bearings than when the standard 83 is omitted.

Obviously those skilled in the art may make various changes in the details and arrangement of parts without departing from the spirit and scope of our invention as defined by the claim. We wish therefore not to be limited to the precise construction herein disclosed.

What we claim and desire to have protected by Letters Patent of the United States is:—

The combination with a standard or support, of a shaft having bearings therein, a brake wheel on said shaft, brake levers, a brake-releasing magnet, a bracket on the magnet frame between said frame and the brake wheel, supporting rods secured to the bracket, and brake springs supported by said rods.

In testimony whereof we have signed our names to this specification in the presence of subscribing witnesses.

DAVID L. LINDQUIST.
ALLEN C. SMITH.

Witnesses:
 JOHN F. RULE,
 MARGARET L. BEARY.

GRIFFITH JOHN.

Witnesses:
 JOB B. FURMAN,
 C. BLUIN.